(12) United States Patent
Chan et al.

(10) Patent No.: US 10,609,995 B2
(45) Date of Patent: Apr. 7, 2020

(54) PORTABLE ELECTRONIC DEVICE CASE

(71) Applicant: Pioneer Square Brands, Inc., Seattle, WA (US)

(72) Inventors: Jaimie Emerald Chan, Renton, WA (US); Michael Cooper Ferren, Camas, WA (US)

(73) Assignee: Pioneer Square Brands, Inc., McLean, VA (US)

( * ) Notice: Subject to any disclaimer, the term of this patent is extended or adjusted under 35 U.S.C. 154(b) by 0 days.

(21) Appl. No.: 16/198,648

(22) Filed: Nov. 21, 2018

(65) Prior Publication Data

US 2019/0150579 A1    May 23, 2019

Related U.S. Application Data

(60) Provisional application No. 62/588,923, filed on Nov. 21, 2017.

(51) Int. Cl.
| H04M 1/00 | (2006.01) |
| A45C 11/00 | (2006.01) |
| H04B 1/3888 | (2015.01) |
| A45C 13/10 | (2006.01) |
| H04B 1/3877 | (2015.01) |

(52) U.S. Cl.
CPC .......... *A45C 11/00* (2013.01); *A45C 13/1084* (2013.01); *H04B 1/3877* (2013.01); *H04B 1/3888* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| 4,669,285 A | * | 6/1987 | Kim | ........................ E05B 37/12 |
| | | | | 70/312 |
| 2011/0253702 A1 | * | 10/2011 | Regan | .................... B23K 9/235 |
| | | | | 219/482 |
| 2012/0037285 A1 | * | 2/2012 | Diebel | .................. G06F 1/1626 |
| | | | | 150/165 |
| 2014/0291175 A1 | * | 10/2014 | Chung | .................. G06F 1/1656 |
| | | | | 206/45.23 |
| 2015/0141092 A1 | * | 5/2015 | Murauyou | ............ G06F 1/1681 |
| | | | | 455/575.8 |
| 2015/0194998 A1 | * | 7/2015 | Fathollahi | ............ H04B 1/3888 |
| | | | | 455/575.8 |

* cited by examiner

*Primary Examiner* — Jinsong Hu
*Assistant Examiner* — Alexander J Yi
(74) *Attorney, Agent, or Firm* — Grandview Law

(57) ABSTRACT

Systems and methods are involved with but are not limited to: a portable electronic device case including a case cover including a first cover portion, and a second cover portion, the first cover portion hingedly coupled to the one or more first peripheral portions of the enclosure periphery, the first cover portion hingedly coupled to the second cover portion wherein in a first configuration the first cover portion and the second cover portion cover a display of a tablet shaped electronic device being received by the enclosure base and the enclosure periphery and in a second configuration the first cover portion and the second cover portion form a stand. In addition to the foregoing, other aspects are described in the claims, drawings, and text forming a part of the present disclosure.

17 Claims, 9 Drawing Sheets

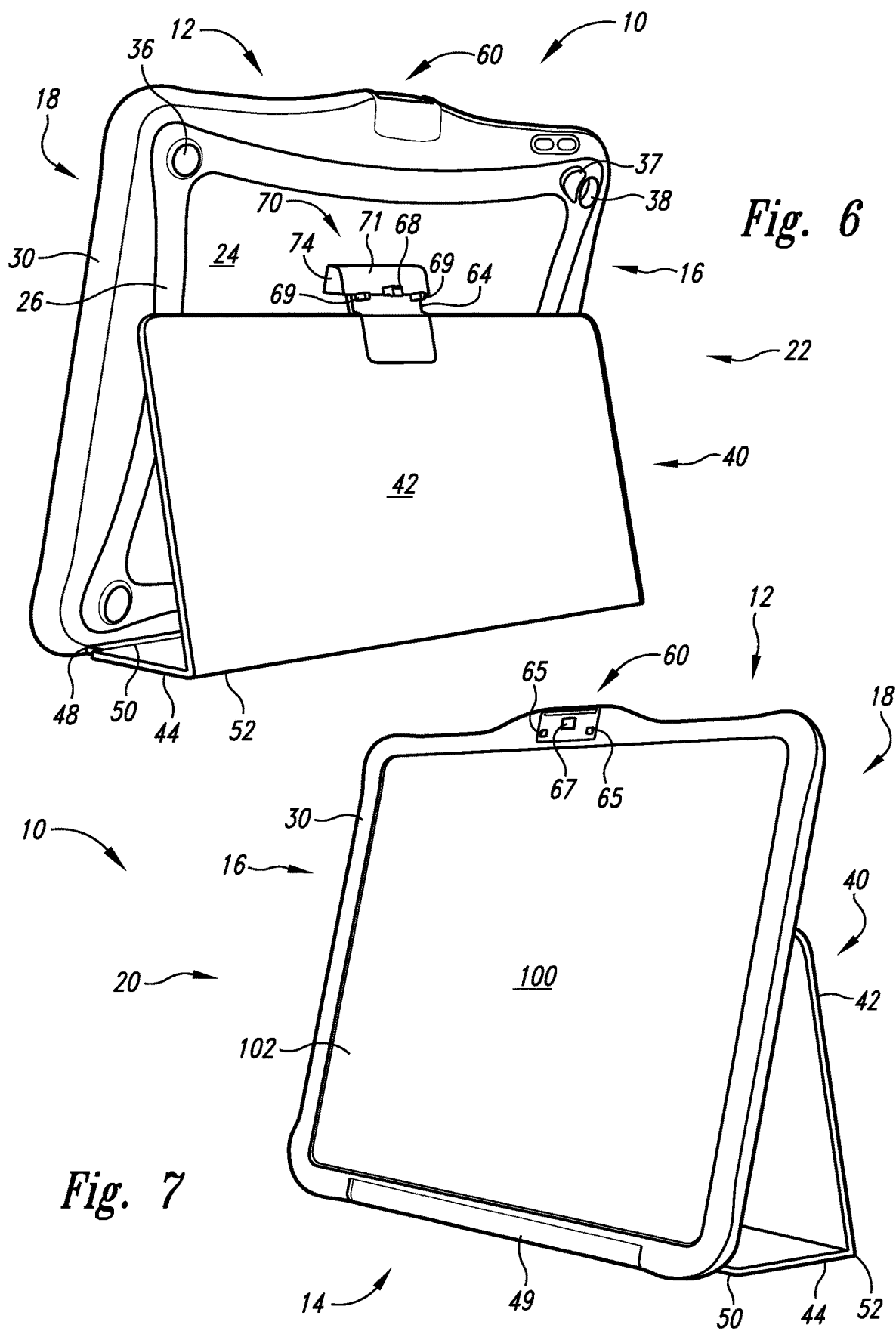

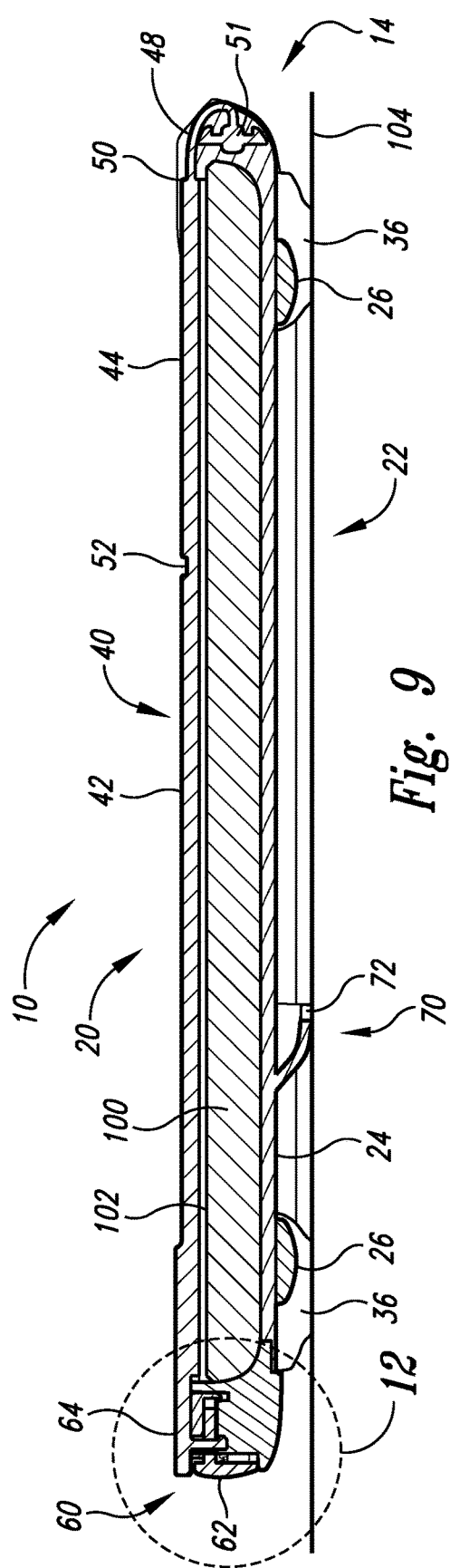
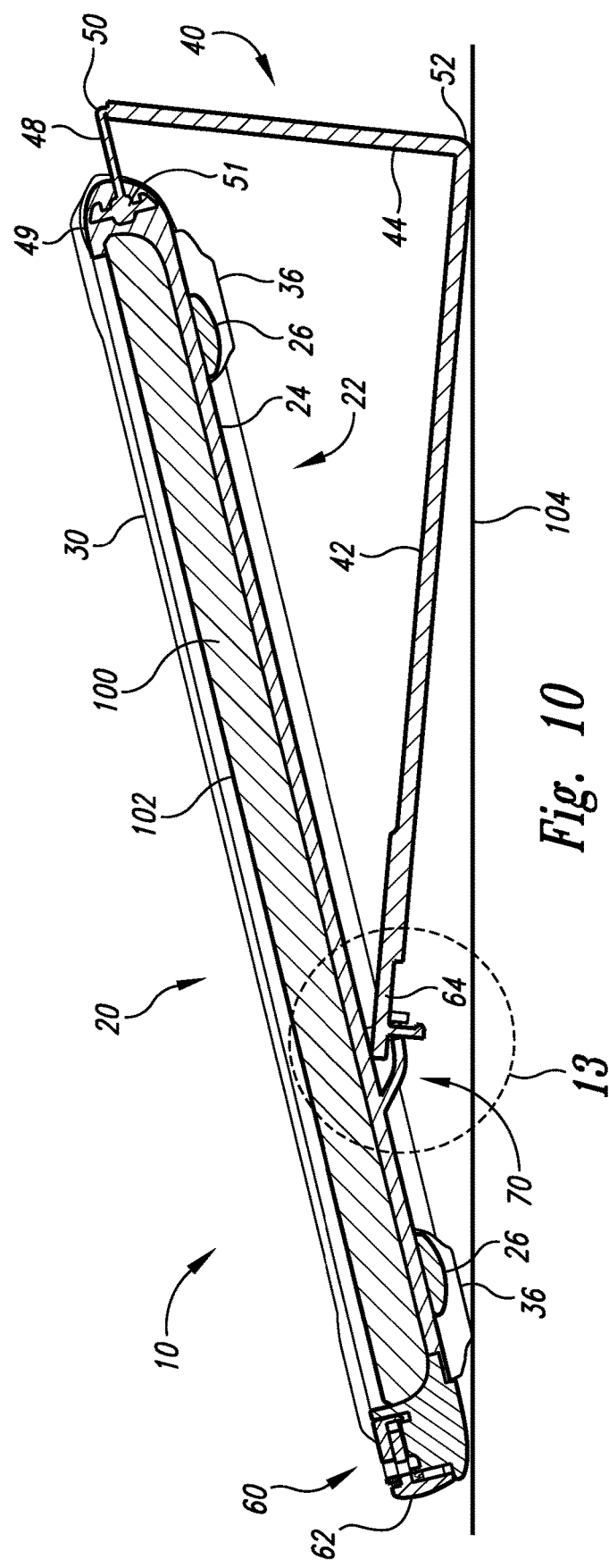

PORTABLE ELECTRONIC DEVICE CASE

SUMMARY

In one aspect, an apparatus includes, but is not limited to a portable electronic device case including a case cover including a first cover portion, and a second cover portion, the first cover portion hingedly coupled to the one or more first peripheral portions of the enclosure periphery, the first cover portion hingedly coupled to the second cover portion wherein in a first configuration the first cover portion and the second cover portion cover a display of a tablet shaped electronic device being received by the enclosure base and the enclosure periphery and in a second configuration the first cover portion and the second cover portion form a stand. In addition to the foregoing, other aspects are described in the claims, drawings, and text forming a part of the present disclosure. Other aspects are described in the claims, drawings, and text forming a part of the disclosure set forth herein.

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

In addition to the foregoing, various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of articles of manufacture that may provide context, for instance, in introducing one or devices described herein.

Figure 1:
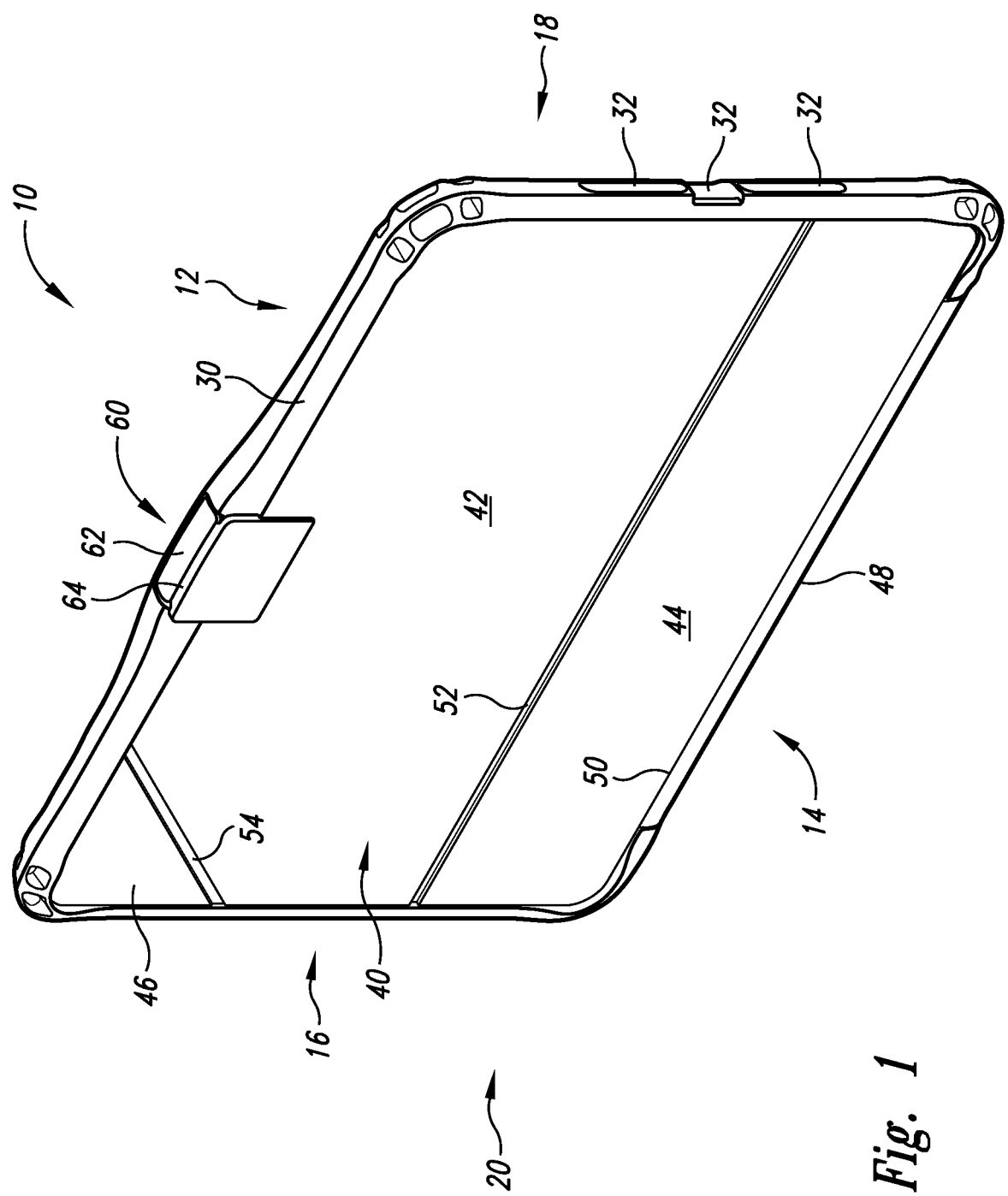

FIG. 1 is a front perspective view of a portable device case in closed configuration.

Figure 2:
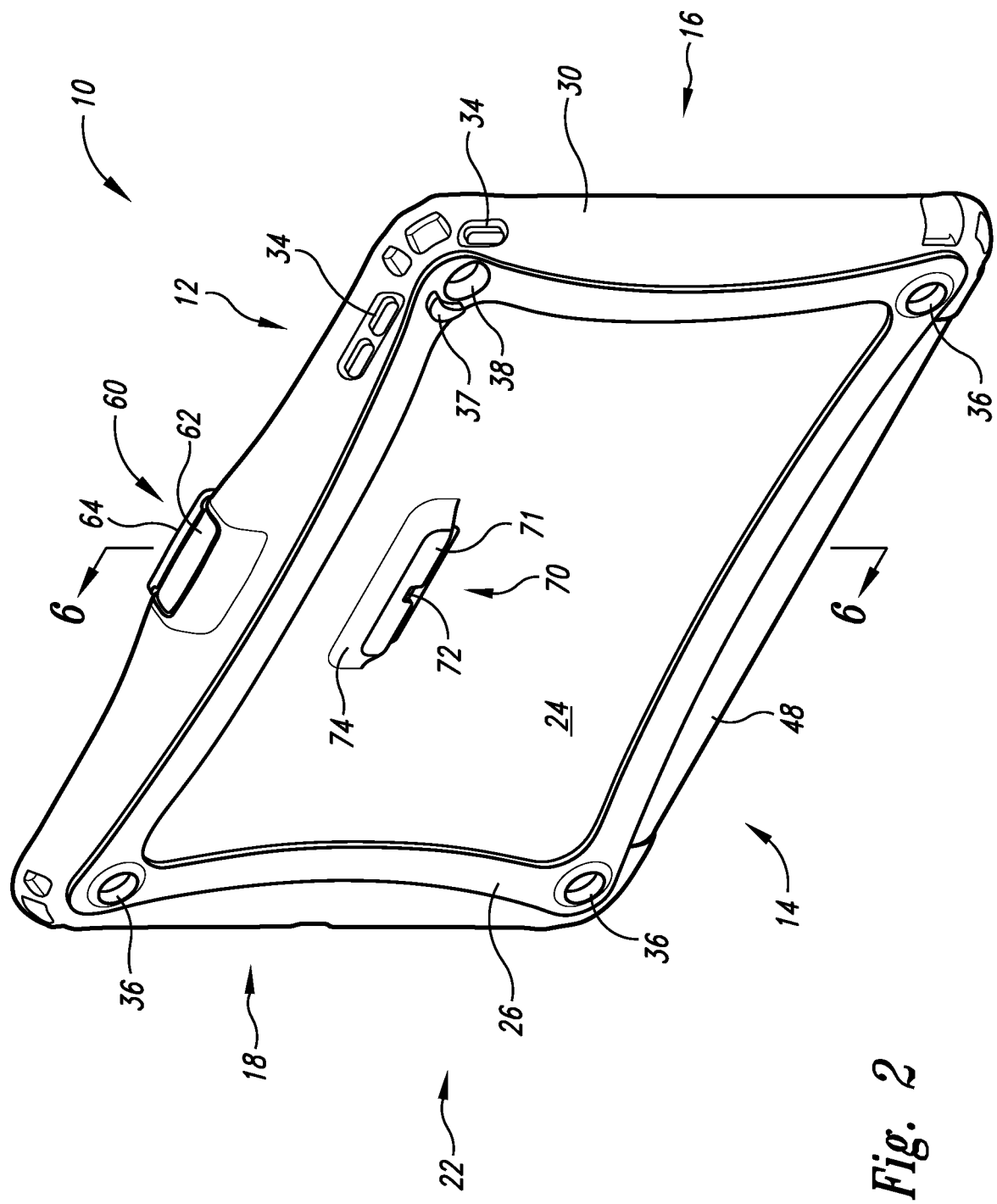

FIG. 2 is a rear perspective view of the portable device case of FIG. 1 in closed configuration.

Figure 3:
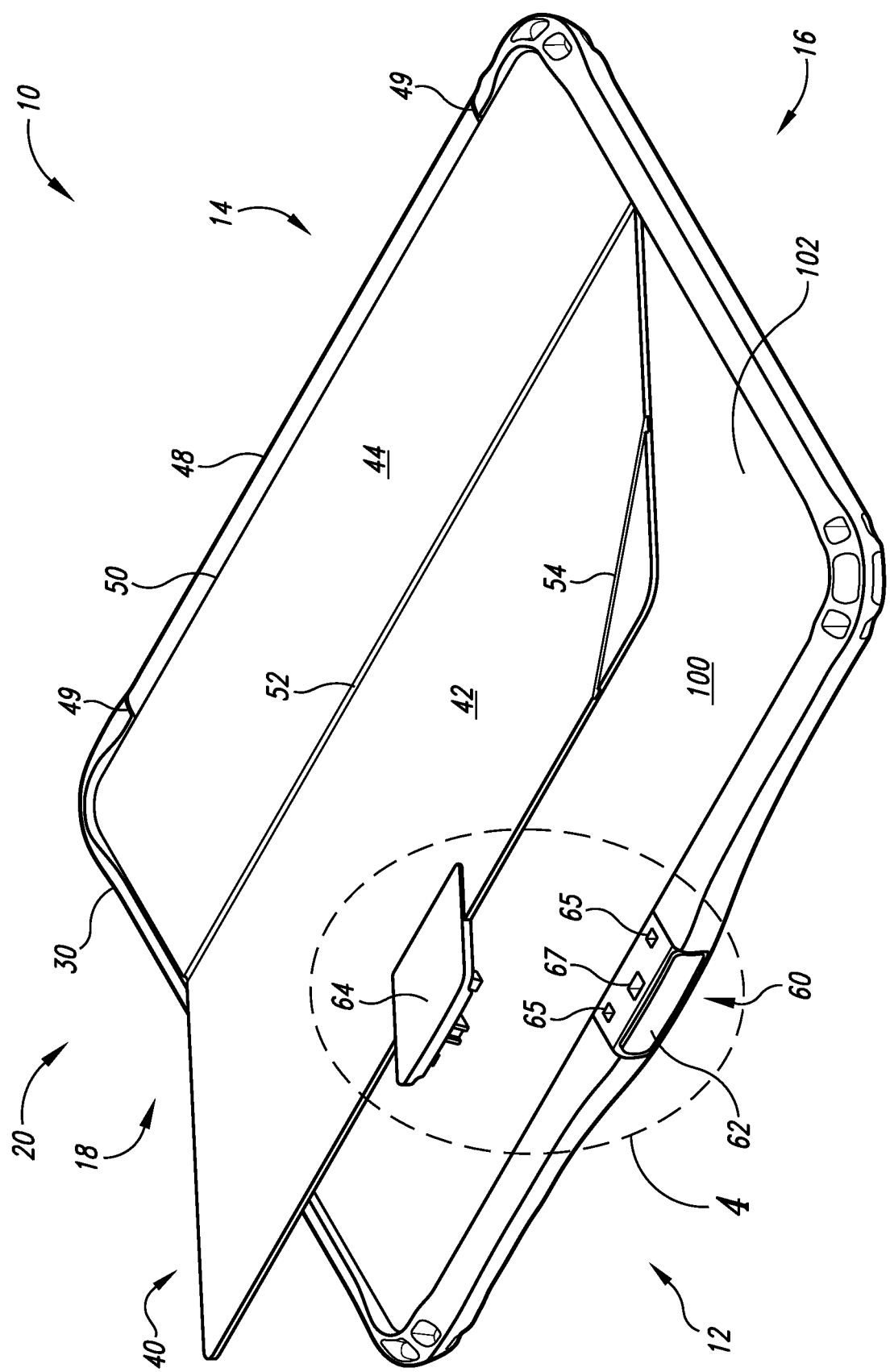

FIG. 3 is a front perspective view of the portable device case of FIG. 1 with cover partially opened from closed configuration.

Figure 4:
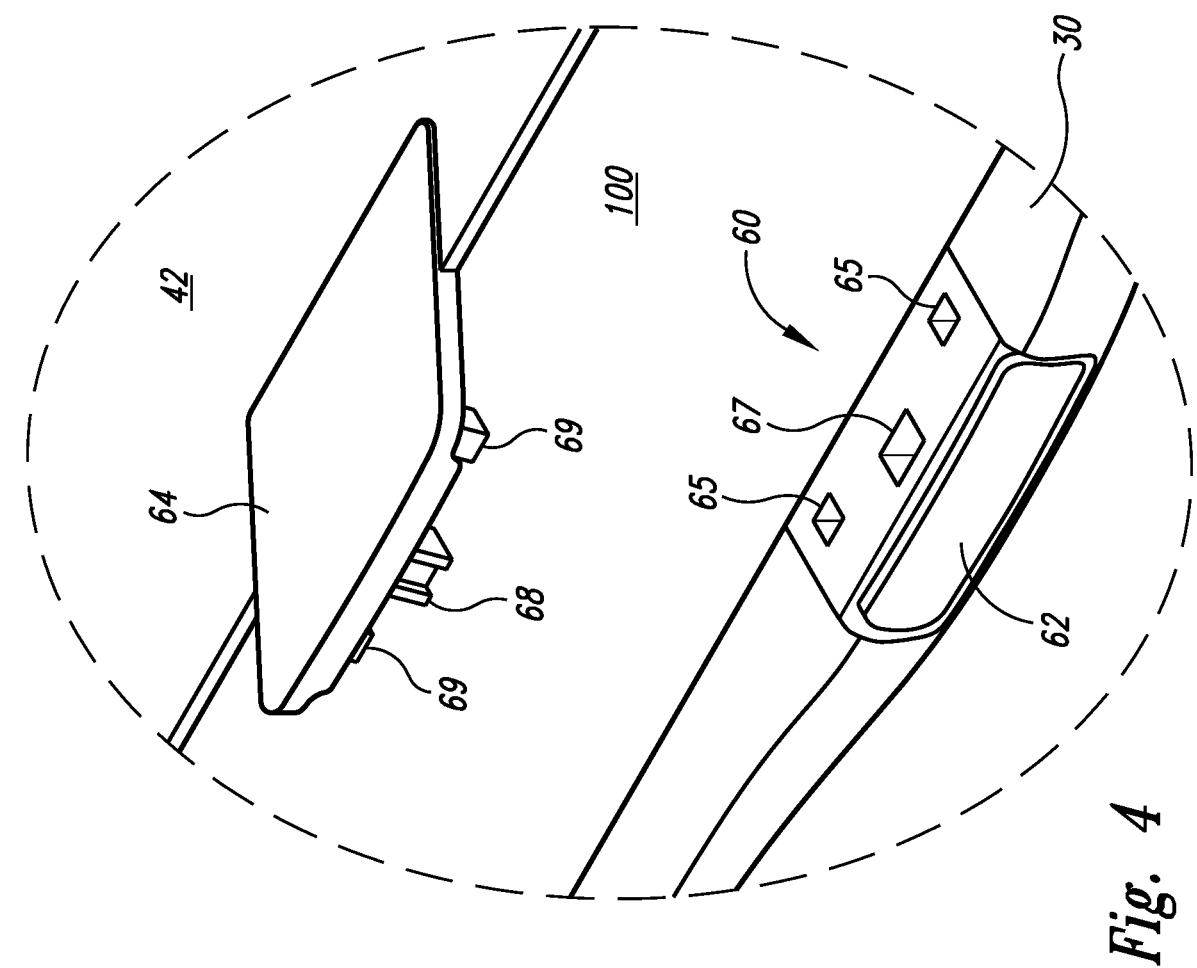

FIG. 4 is a magnified portion of FIG. 3 showing fastener detail of the portable device case of FIG. 1.

Figure 5:
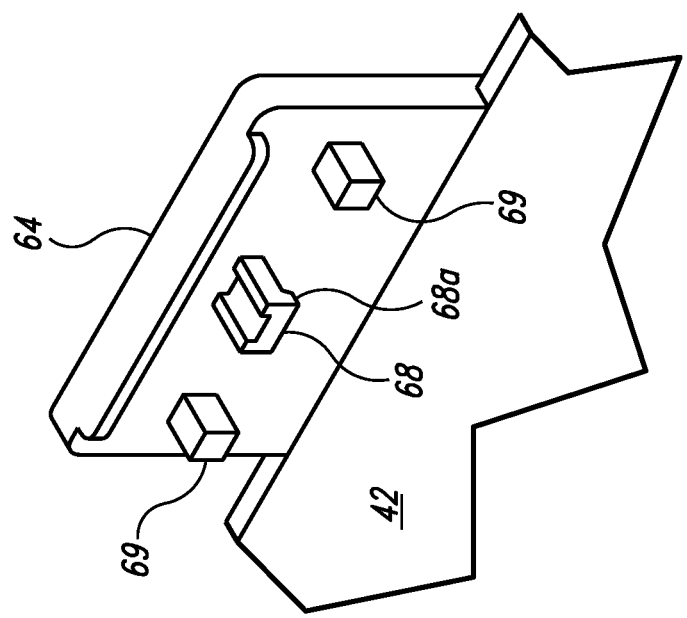

FIG. 5 is a bottom perspective view of a latch portion of the portable device case of FIG. 1.

FIG. 6 is a rear perspective view of the portable device case of FIG. 1 in stand configuration with first orientation.

FIG. 7 is a front perspective view of the portable device case of FIG. 1 in stand configuration with first orientation.

Figure 8:
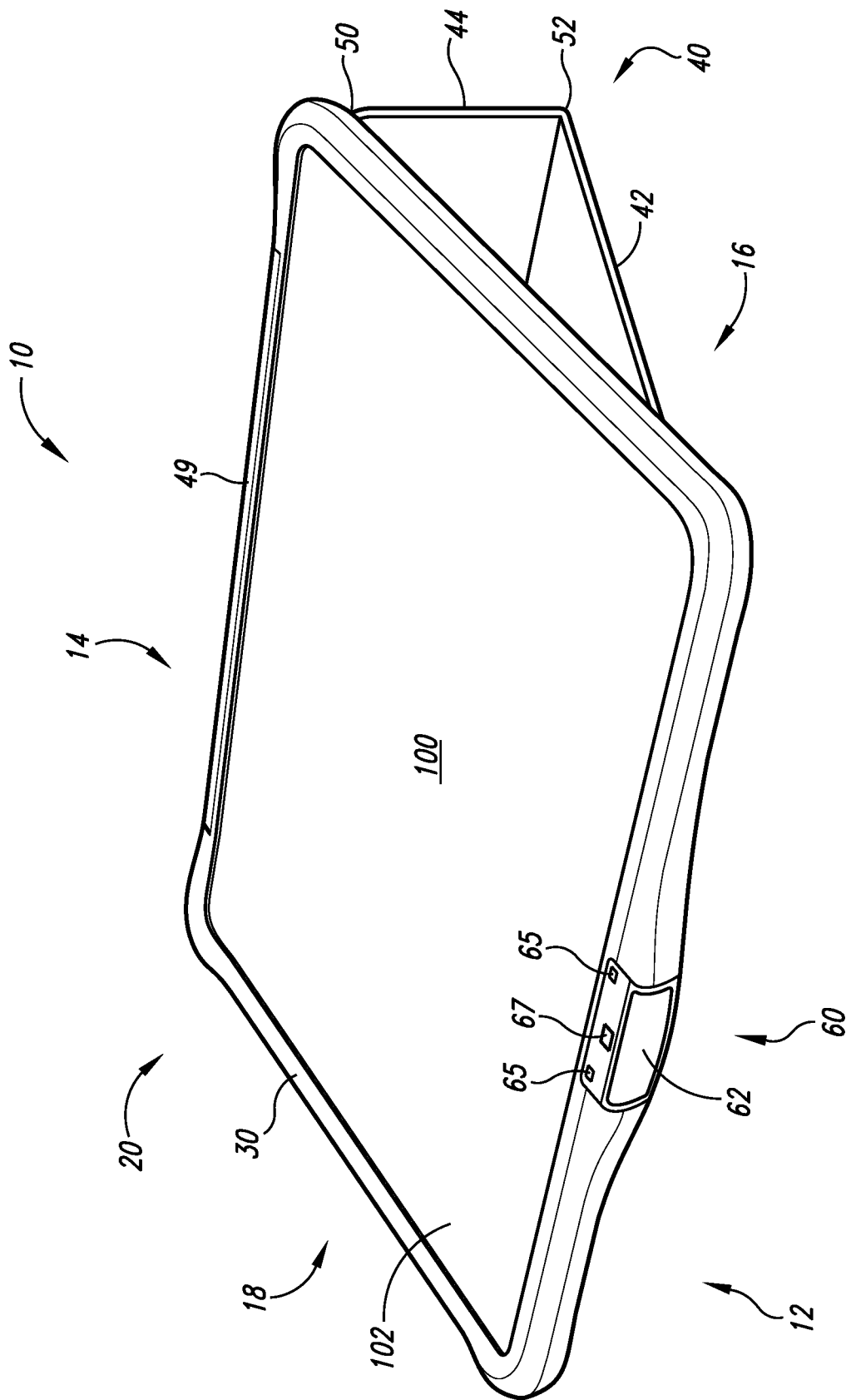

FIG. 8 is a front perspective view of the portable device case of FIG. 1 in stand configuration with second orientation.

FIG. 9 is a cross-sectional view of the portable device case of FIG. 1 in closed configuration.

FIG. 10 is a cross-sectional view of the portable device case of FIG. 1 in stand configuration with second orientation.

Figure 11:
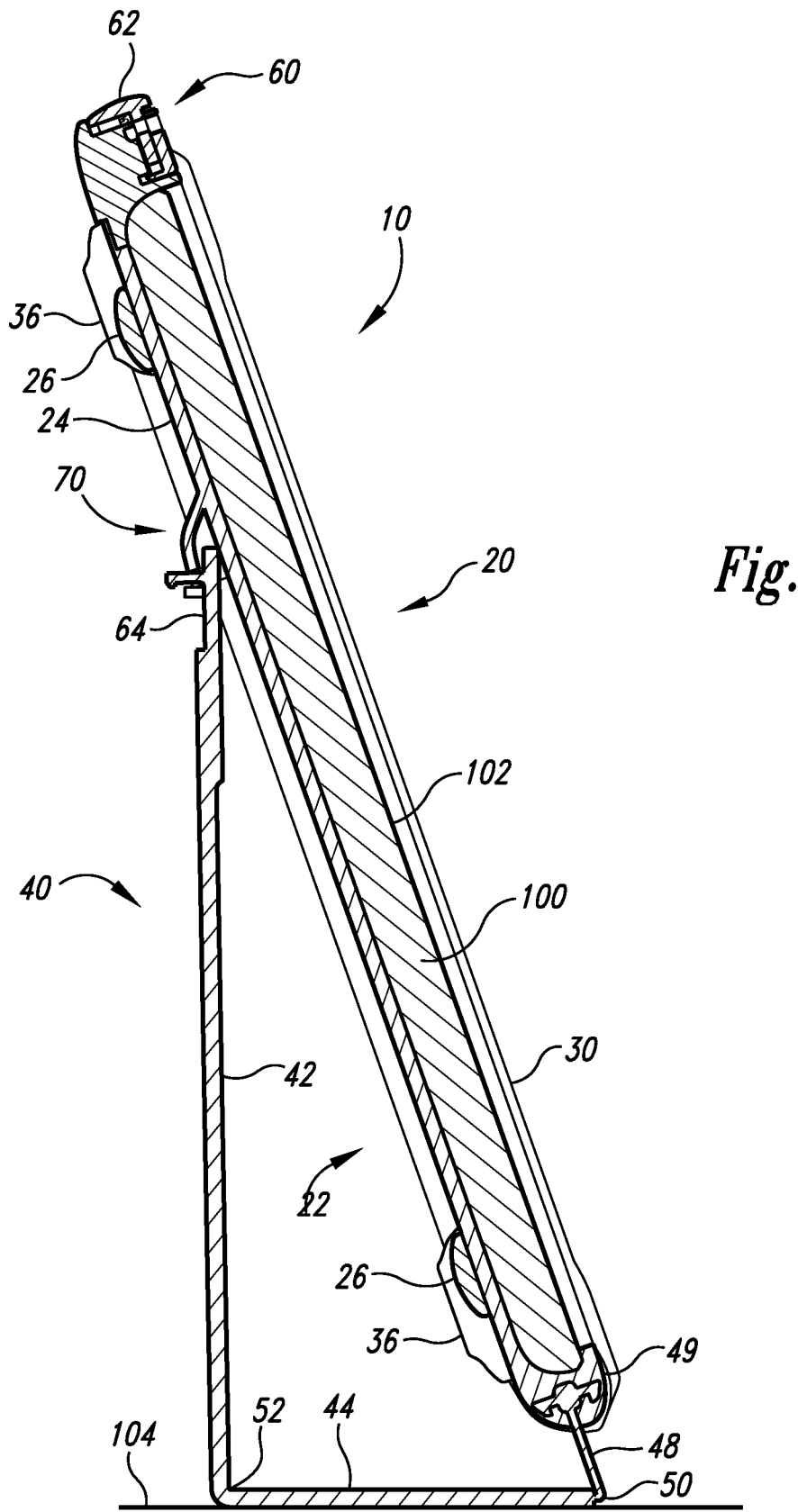

FIG. 11 is a cross-sectional view of the portable device case of FIG. 1 in stand configuration with first orientation.

Figure 12:
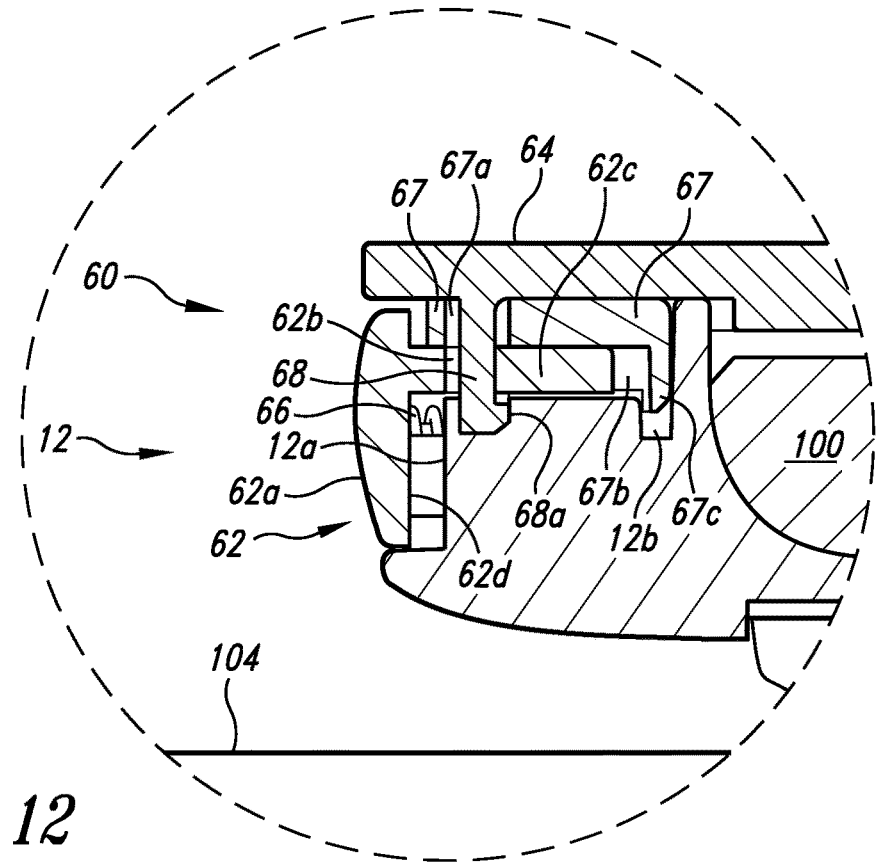

FIG. 12 is an enlarged cross-sectional view of cover clasp assembly of FIG. 9 of the portable device case of FIG. 1.

Figure 13:
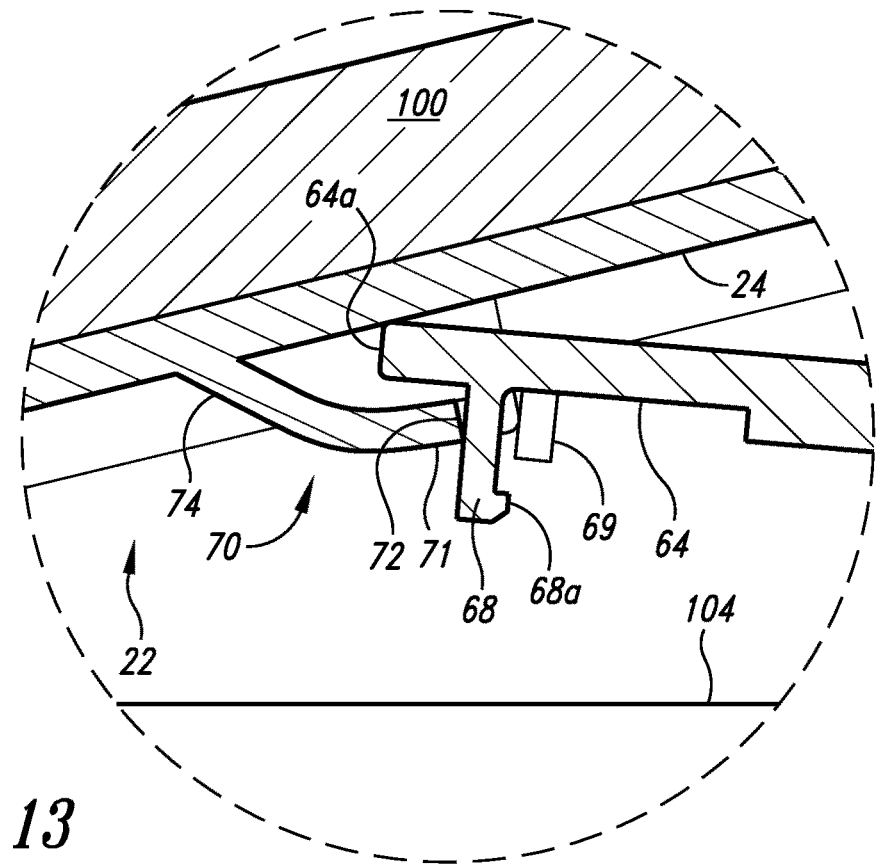

FIG. 13 is an enlarged cross-sectional view of stand clasp assembly of FIG. 10 of the portable device case of FIG. 1.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Portable electronic devices, such as electronic tablets, along with their conventional cases, can pose challenges in ease of use for securely closing case covers and/or stands and also readily opening them as well.

Referring to FIG. 1, portable device case 10 in closed configuration is depicted from a front perspective view to include first side 12, second side 14, third side 16, fourth side 18, front face 20, and rear face 22 (see FIG. 2). As shown in FIG. 1, enclosure perimeter 30 includes sides 12-18, along with enclosure base 24 (see FIG. 2), is shaped to contain a portable device. Enclosure perimeter 30 includes ports 32, which allow various electronic data access. Further shown in FIG. 1, front face 20 includes cover 40 with first cover portion 42, second cover portion 44, third cover portion 46, first hinge 48, second hinge 50, third hinge 52, and fourth hinge 54. First hinge 48 is shown coupled with second side 14 of portable device case 10 and second hinge 50. In turn, second hinge 50 is shown coupled with first hinge 48 and second cover portion 44. Further, third hinge 52 is shown coupled with first cover portion 42 and second cover portion 44. Furthermore, fourth hinge 54 is shown coupled with first cover portion 42 and third cover portion 46. The third cover portion 46 is opened to reveal camera functionality of a portable electronic device being received by the portable device case 10 so that the fourth hinge 54 only allows for bending in the one direction appropriate to such access. Also shown in FIG. 1 is clasp assembly 60 with clasp release button 62. Clasp assembly 60 is also shown in FIG. 1 as having clasp extension portion 64 coupled with first cover portion 42. In FIG. 1, clasp extension portion 64 is coupled with other portions of clasp assembly 60 to thereby secure cover 40 in a closed position. The hinges and cover portions can be made from the same material using appropriate flexibility and thicknesses as exemplified through the figure illustrations. Such materials from thermoplastics and such can be useful in molding for a continuous flexible material application between hinges and cover portions.

Turning to FIG. 2, rear face 22 of portable device case 10 has enclosure base 24 and frame 26 with first feet 36 and second foot 37 to support when place on a horizontal surface such as a desk or table. Frame 26 also has aperture 38 to allow optical access for a camera lens of a portable device (generally shown in FIG. 3) being contained by the portable device case 10. Also shown in FIG. 2 is rear face 22 of portable device case 10 including enclosure perimeter 30 allowing for access to various control buttons 34 found on a portable device contained thereby. FIG. 2 further depicts rear face 22 having stand catch 70 extending from enclosure base 24. Stand catch 70 includes front face 71 with notch 72. Front face 71 is gapped away from enclosure base 24 through curvilinear portion 74 extending between front face 71 and enclosure base 24.

Referring now to FIG. 3, portable device case 10 is shown with clasp extension portion 64 uncoupled with other portions of clasp assembly 60 to thereby allow for partially opening of cover 60. As shown, hinge 52 has allowed repositioning of first cover portion 42 relative to its position shown in FIG. 1, which also provides visual access of various other portions of clasp assembly 60 including first apertures 65 and second aperture 67. Also shown in FIG. 3 as being contained by portable device case 10 is a portion of a portable device 100, which includes display 102. Portable device case 10 is shown to include second side recess 49 that accommodates second hinge 50 while second cover portion 44 remains closed.

Regarding clasp assembly 60, FIG. 4 and FIG. 5 show detail of clasp extension portion 64 including first projections 69 and second projection 68 to be received by first aperture 65 and second aperture 67, respectively. Second projection 68 is shown in FIG. 5 to include angled-end 68a.

As to FIG. 6, FIG. 7, and FIG. 8, portable device case 10 is depicted wherein cover 40 is in stand configuration to serve as a stand for portable device 100 contained therein. In stand configuration of cover 40, first hinge 48, second hinge 50, and third hinge 52 are so bent to allow first cover portion 42, second cover portion 44, and third cover 46 portion to be so positioned adjacent rear face 22 to form a bent-L stand configuration with part of clasp extension 64 inserted into stand catch 70 to secure such configuration. Clasp extension portion 64 is shown in FIG. 6 as partially positioned in gap between front face 71 of stand catch 70 and enclosure base 24. Second projection 68 of clasp extension portion 64 is depicted as positioned in notch 72 of stand catch 70 whereas first projections are shown adjacent front face 71 of stand catch 70. FIG. 6 and FIG. 7 show second cover portion 44 horizontally positioned in a first orientation whereas FIG. 8 shows first cover portion 42 horizontally positioned in a second orientation. First orientation allows for positioning of display 102 of portable device 100 similar to positioning of a workstation monitor whereas second orientation allows for positioning of display 102 similar to some styles of angled writing or drawing desks. As discussed above, the third cover portion 46 is opened to reveal camera functionality of a portable electronic device being received by the portable device case 10 so that the fourth hinge 54 only allows for bending in the one direction appropriate to such access so that the fourth hinge 54 is not shown in FIG. 6.

Turning to FIG. 9, portable device case 10 is depicted in cross-sectional view in closed configuration showing internal detail as it rests upon horizontal surface 104 such as a table or a desk top surface. For instance, anchor 51 is embedded in second side 14 of portable device case 10 and is so shaped to provide firm positioning of first hinge 48 coupled thereto despite forces imposed thereupon through customary use. Internals of clasp assembly 60 are shown and will be discussed further below in relation to FIG. 12.

As to FIG. 10 and FIG. 11, portable device case 10 is depicted in cross-sectional view of its stand configuration in second orientation and first orientation, respectively showing internal detail. Internals of stand catch 70 are shown and will be discussed further below in relation to FIG. 13.

Regarding FIG. 12, an enlarged cross-sectional view of clasp assembly 60 is shown to further include external button surface 62a, button stem aperture 62b, button stem 62c, and internal button surface 62d of clasp release button 62; spring 66; member 67 with aperture 67a, aperture 67b, and angled end 67c. First side 12 of portable device case 10 also further includes internal surface 12a and notch 12b. FIG. 12 shows the button stem 62c positioned so that only a portion of the button stem aperture 62b is aligned with the aperture 67b of member 67 in order to use the angled end 68a of the second projection 68 to securely couple the clasp extension portion 64 with the base enclosure 30.

Regarding FIG. 13, an enlarged cross-sectional view of clasp assembly 60 is shown to further include an end portion 64a of clasp extension portion 64.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A portable electronic device case comprising:
   an enclosure base and an enclosure periphery extending therefrom,
   the enclosure base and the enclosure periphery shaped and sized to receive a tablet shaped electronic device having a front face with a device display and a rear face opposite the front face,
   the enclosure periphery including two planar vertical first peripheral portions and two planar horizontal second peripheral portions,
   the enclosure base having a front face and a rear face, the front face of the enclosure base being positioned to be adjacent to the rear face of the received tablet shaped electronic device;
   a case cover hingedly coupled to the two vertical planar first peripheral portions of the enclosure periphery on the front face of the enclosure base to allow for sliding movement of the case cover between a closed position and a stand position,
   the case cover including a first cover portion including substantially planar first side and second side, the second side being opposite the first side,
   in the closed position of the case cover, the first side of the first cover portion being positioned to be contiguous with at least a portion of the device display of the front face of the received tablet shaped electronic device,
   the first side of the first cover portion and the front face of the enclosure base being facing toward each other, and the second side of the first cover portion being facing away from the front face of the enclosure base,
   in the stand position of the case cover, the second side of the first cover portion and the rear face of the enclosure base being at least partially facing away each other wherein the second side of the first cover portion is facing in a first direction with at least a first directional component and the rear face of the enclosure base is facing in a second direction with at least a second directional component, the first and second directional components having directions opposite to one another, and
   in the stand position of the case cover, the first side of the first cover portion being at least partially facing toward the rear face of the enclosure base wherein the first side of the first cover portion is facing in a third direction with at least a third directional component, the third directional component having the same direction as the second directional component of the rear face of the enclosure base;
   a clasp assembly including a first component including an extension portion coupled to an edge portion located opposite to the hinged side of the case cover and extending outwardly therefrom, a first projection coupled to the extension portion, one or more second projections coupled to the extension portion,
   a second component coupled to bottom one of the two planar horizontal second peripheral portions of the enclosure periphery, the second component including a first aperture sized to receive the first projection of the first component, one or more second apertures sized to receive the one or more second projections of the first component,
   a release button including a button stem with a button stem aperture, the button stem aperture sized to receive the first projection of the first component,
   the release button movable between at least a first position and a second position, the first position allowing alignment of the button stem aperture with the first aperture of the second component; and
   a stand catch coupled to the front face of the enclosure base, the stand catch configured to nonmagnetically removably couple with the first component of the clasp assembly, the stand catch including a notch sized and shaped to detachably engage with the first projection of the clasp assembly.

2. The portable electronic device case of claim 1 further comprising a hinge, wherein the case cover is hingedly coupled to the one or more first peripheral portions of the enclosure periphery via the hinge, the hinge and the case cover being of same continuous material.

3. The portable electronic device case of claim 1 further comprising a hinge, wherein the case cover is hingedly coupled to the one or more first peripheral portions of the enclosure periphery via the hinge, the hinge being of a flexible material.

4. The portable electronic device case of claim 1 wherein the first projection includes an angled end and wherein the first position of the release button allows for passage of the angled end of the first projection through the button stem aperture.

5. The portable electronic device case of claim 4 wherein the release button includes a second position, which disallows passage of the angle end of the first projection through the button stem aperture.

6. The portable electronic device case of claim 1 wherein the case cover includes a second cover portion hingedly coupled to the first cover portion, the first cover portion and the second cover portion being positioned in non-parallel orientation with respect to one another when the first component of the clasp assembly is coupled with the stand catch.

7. The portable electronic device case of claim 1 further comprising a hinge, wherein the case cover is hingedly coupled to the one or more first peripheral portions of the enclosure periphery via the hinge, the hinge being of a flexible material.

8. The portable electronic device case of claim 7 further comprising an anchor nonremovably embedded in the one or more first peripheral portions of the enclosure periphery, the hinge coupled to the anchor.

9. A portable electronic device case comprising:
an enclosure base and an enclosure periphery extending therefrom,
the enclosure base and the enclosure periphery shaped and sized to receive a tablet shaped electronic device having oppositely facing front and rear faces,
the front face of the tablet shaped electronic device including a device display,
the enclosure periphery including two planar vertical first peripheral portions and two planar horizontal second peripheral portions,
the enclosure base having oppositely facing front and rear faces, the front face of the enclosure base positioned to be adjacent to the rear face of the received tablet shaped electronic device;
a case cover hingedly coupled to the two vertical planar first peripheral portions of the enclosure periphery on the front face of the enclosure base to allow for sliding movement of the case cover between a closed position and a stand position,
the case cover including a first cover portion including substantially planar first side and second side, the second side being opposite the first side,
in the closed position of the case cover, the first side of the first cover portion being positioned to be contiguous with at least a portion of the device display of the front face of the received tablet shaped electronic device,
the first side of the first cover portion and the front face of the enclosure base being facing toward each other, and the second side of the first cover portion being facing away from the front face of the enclosure base, and
the second side of the first cover portion being facing away from the at least a portion of the device display of the front of the tablet shaped electronic device,
in the stand position of the case cover, the second side of the first cover portion and the rear face of the enclosure base being at least partially facing away from each other wherein the second side of the first cover portion is facing in a first direction with at least a first directional component and the rear face of the enclosure base is facing in a second direction with at least a second directional component, the first and second directional components having directions opposite to one another, and
in the stand position of the case cover, the first side of the first cover portion being at least partially facing toward the rear face of the enclosure base wherein the first side of the first cover portion is facing in a third direction with at least a third directional component, the third directional component having the same direction as the second directional component of the rear face of the enclosure base;
a clasp assembly including a first component including an extension portion coupled to an edge portion located opposite to the hinged side of the case cover and extending outwardly therefrom, a first projection coupled to the extension portion, one or more second projections coupled to the extension portion,
a second component coupled to bottom one of the two planar horizontal second peripheral portions of the enclosure periphery, the second component including a first aperture sized to receive the first projection of the first component, one or more second apertures sized to receive the one or more second projections of the first component,
a release button including a button stem with a button stem aperture, the button stem aperture sized to receive the first projection of the first component,
the release button movable between at least a first position and a second position, the first position allowing alignment of the button stem aperture with the first aperture of the second component; and
a stand catch coupled to the front face of the enclosure base, the stand catch configured to nonmagnetically removably couple with the first component of the clasp assembly, the stand catch including a notch sized and shaped to detachably engage with the first projection of the clasp assembly.

10. The portable electronic device case of claim 9 further comprising a hinge, wherein the case cover is hingedly coupled to the one or more first peripheral portions of the enclosure periphery via the hinge, the hinge and the case cover being of same continuous material.

11. The portable electronic device case of claim 9 further comprising a hinge, wherein the case cover is hingedly coupled to the one or more first peripheral portions of the enclosure periphery via the hinge, the hinge being of a flexible material.

12. The portable electronic device case of claim 9 wherein the first projection includes an angled end and wherein the first position of the release button allows for passage of the angled end of the first projection through the button stem aperture.

13. The portable electronic device case of claim 12 wherein the release button includes a second position, which disallows passage of the angle end of the first projection through the button stem aperture.

14. The portable electronic device case of claim 9 wherein the case cover includes a second cover portion hingedly coupled to the first cover portion, the first cover portion and the second cover portion being positioned in non-parallel orientation with respect to one another when the first component of the clasp assembly is coupled with the stand catch.

15. The portable electronic device case of claim 9 further comprising a hinge, wherein the case cover is hingedly coupled to the one or more first peripheral portions of the enclosure periphery via the hinge, the hinge being of a flexible material.

16. The portable electronic device case of claim 15 further comprising an anchor nonremovably embedded in the one or more first peripheral portions of the enclosure periphery, the hinge coupled to the anchor.

17. The portable electronic device case of claim 9 wherein the stand catch includes a notch sized and shaped to detachably engage with the first projection of the clasp assembly.

* * * * *